(12) United States Patent
Hiraiwa et al.

(10) Patent No.: US 9,692,062 B2
(45) Date of Patent: Jun. 27, 2017

(54) FUEL CELL AND METHOD FOR OPERATING THE FUEL CELL

(71) Applicant: SUMITOMO ELECTRIC INDUSTRIES, LTD., Osaka-shi, Osaka (JP)

(72) Inventors: Chihiro Hiraiwa, Itami (JP); Masatoshi Majima, Itami (JP); Akihisa Hosoe, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/432,248

(22) PCT Filed: Oct. 4, 2013

(86) PCT No.: PCT/JP2013/077064
§ 371 (c)(1),
(2) Date: Mar. 30, 2015

(87) PCT Pub. No.: WO2014/057877
PCT Pub. Date: Apr. 17, 2014

(65) Prior Publication Data
US 2015/0263355 A1    Sep. 17, 2015

(30) Foreign Application Priority Data
Oct. 12, 2012    (JP) ................. 2012-227325

(51) Int. Cl.
*H01M 8/04* (2016.01)
*H01M 8/0232* (2016.01)
(Continued)

(52) U.S. Cl.
CPC .......... *H01M 8/0232* (2013.01); *H01B 1/122* (2013.01); *H01M 8/0245* (2013.01);
(Continued)

(58) Field of Classification Search
None
See application file for complete search history.

(56) References Cited

U.S. PATENT DOCUMENTS 6,268,076 B1    7/2001   Diekmann et al.
2006/0040156 A1    2/2006   Tano et al.

FOREIGN PATENT DOCUMENTS

CN    1809945 A    7/2006
CN    101142150 A    3/2008
(Continued)

OTHER PUBLICATIONS

JP2012-192350 (Oct. 11, 2012) machine translation.*
(Continued)

*Primary Examiner* — Tracy Dove
(74) *Attorney, Agent, or Firm* — Drinker Biddle & Reath LLP (57) ABSTRACT

Provided are a fuel cell that employs a fuel-electrode collector excellent in terms of thermal conductivity and the like, so that it is excellent in terms of power generation efficiency and cost effectiveness; and a method for operating the fuel cell. Included are a membrane electrode assembly (MEA), a fuel-electrode collector that is a porous metal body disposed in contact with a fuel electrode and performing current collection, and a heating device operated by electric power, wherein a solid electrolyte is a proton-permeable electrolyte, a fuel-gas channel is provided to cause a fuel gas to pass through the fuel-electrode collector, and the porous metal body constituting the fuel-electrode collector is formed of aluminum or aluminum alloy.

9 Claims, 5 Drawing Sheets

(51) Int. Cl.
  *H01M 8/04007* (2016.01)
  *H01M 8/04119* (2016.01)
  *H01M 8/0432* (2016.01)
  *H01M 8/04746* (2016.01)
  *H01M 8/0245* (2016.01)
  *H01M 8/04223* (2016.01)
  *H01M 8/04701* (2016.01)
  *H01B 1/12* (2006.01)
  *H01M 8/124* (2016.01)
  *H01M 8/0612* (2016.01)

(52) U.S. Cl.
  CPC ... *H01M 8/04037* (2013.01); *H01M 8/04126* (2013.01); *H01M 8/04268* (2013.01); *H01M 8/04365* (2013.01); *H01M 8/04731* (2013.01); *H01M 8/04753* (2013.01); *H01M 8/04067* (2013.01); *H01M 8/0612* (2013.01); *H01M 2008/1293* (2013.01); *H01M 2300/0071* (2013.01)

(56) References Cited

FOREIGN PATENT DOCUMENTS

| | | |
|---|---|---|
| CN | 101300704 A | 11/2008 |
| EP | 1 376 727 A2 | 1/2004 |
| EP | 1 864 955 A1 | 12/2007 |
| JP | H10-79258 A | 3/1998 |
| JP | 2006-324025 A | 11/2006 |
| JP | 2007-141743 A | 6/2007 |
| JP | 2008-532215 A | 8/2008 |
| JP | 2009-187887 A | 8/2009 |
| JP | 2012-186134 A | 9/2012 |
| JP | 2012-192350 A | 10/2012 |
| WO | WO-2007/052633 A1 | 5/2007 |
| WO | WO-2012/036057 A1 | 3/2012 |

OTHER PUBLICATIONS

Notification of the First Office Action issued Jul. 1, 2016 in Chinese Patent Application No. 2013800534680 (7 pages) with an English Translation (9 pages).

* cited by examiner

FUEL CELL AND METHOD FOR OPERATING THE FUEL CELL

TECHNICAL FIELD

The present invention relates to a fuel cell and a method for operating the fuel cell, more specifically, to a fuel cell excellent in terms of energy efficiency and a method for operating the fuel cell.

BACKGROUND ART

Solid electrolyte fuel cells (hereafter referred to as fuel cells) are advantageous in that, for example, power can be generated at a high efficiency and waste heat can be used. For this reason, fuel cells have been developed. Such a fuel cell has, as a basic unit, a membrane electrode assembly (MEA) including a fuel electrode (anode), a solid oxide electrolyte, and an air electrode (cathode). The fuel cell further has a fuel-electrode collector disposed in contact with the fuel electrode of the MEA and a fuel-electrode channel that supplies a fuel gas such as hydrogen to the fuel electrode; and, similarly for the air electrode, which constitutes a pair together with the fuel electrode, the fuel cell has an air-electrode collector disposed in contact with the air electrode and an air channel that supplies the air to the air electrode. In general, the fuel-electrode collector and the air-electrode collector are conductive porous bodies through which a fuel gas or hydrogen and an oxidizing gas or air are passed. In other words, each electrode collector functions as a current collector and also serves as a gas channel. For this reason, the electrode collector primarily needs to have a high electric conductivity and not to increase the pressure drop of gas flow.

On the other hand, in order to cause an electrochemical reaction to proceed in a fuel cell at a reaction rate on the practical level, temperatures slightly higher than room temperature are not sufficient for the MEA, the fuel gas, and the like and heating with a heating device needs to be performed. In order to reduce the time for which protons $H^+$ and the like generated during the electrochemical reaction travel through the solid electrolyte and in order to promote the electrochemical reaction itself, in general, the MEA and the like are set to a temperature of about 700° C. to about 900° C. Naturally, consumption of electric power for the heating results in a decrease in energy efficiency. In order to increase the rate of the electrochemical reaction, it is important that the gas introduced from the outside into the channel of the fuel cell reaches a temperature at a portion that is as near as possible to the inlet of the channel. For this reason, a process of preheating the gas is usually employed. In this case, the temperature of the inside (the MEA, the fuel-gas channel, and the like) of the fuel cell desirably reaches a predetermined temperature in a short time from the start-up of the fuel cell. In order to achieve such a temperature increase of the inside of the fuel cell in a short time from the start-up thereof, it is important to form the fuel-electrode collector and the like constituting the gas channels so as to have a high thermal conductivity.

As described above, a fuel cell is heated to a high temperature. For this reason, materials forming the fuel-electrode collector and the like need to have resistance to high-temperature oxidation and, in general, such materials are nickel (Ni) and the like. For the purpose of suppressing an increase in pressure drop and ensuring electric conductivity and thermal conductivity, examples of using Ni felt or Ni mesh as electrode collectors have been disclosed (Patent Literatures 1, 2, and 3). Another example of using a Ni-plating porous body or the like as a fuel-electrode collector has also been disclosed (Patent Literature 4).

Use of such a porous metal body can provide an electrode collector that satisfies some of the above-described properties.

CITATION LIST

Patent Literature

PTL 1: Japanese Unexamined Patent Application Publication No. 10-079258
PTL 2: Japanese Unexamined Patent Application Publication No. 2006-324025
PTL 3: Japanese Unexamined Patent Application Publication No. 2007-141743
PTL 4: Japanese Unexamined Patent Application Publication No. 2009-187887

SUMMARY OF INVENTION

Technical Problem

However, the above-described materials have the following problems. In the case of using Ni felt or Ni mesh, which has a low porosity, gas may be passed so as to suppress pressure drop; as a result, the gas is supplied at a very low rate. In addition, Ni felt and the like do not allow a sufficiently large contact area with an electrode and hence the contact electric resistance becomes unavoidably high. On the other hand, in the case of using a Ni-plating porous body, there are no disadvantages in terms of porosity (pressure drop) and electric conductivity; however, a low thermal conductivity hampers a rapid temperature increase in the inside of the Ni-plating porous body, which is problematic.

An object of the present invention is to provide a fuel cell that employs an electrode collector having sufficiently high performance in terms of three items of pressure drop, electric conductivity, and thermal conductivity, so that the fuel cell becomes operable in a short time from the start-up thereof, allows a high power generation efficiency, and is highly cost effective; and a method for operating the fuel cell.

Solution to Problem

A fuel cell according to the present invention generates power from a hydrogen-containing fuel gas by an electrochemical reaction. This fuel cell includes a membrane electrode assembly (MEA) including a fuel electrode, a solid electrolyte, and an air electrode; a fuel-electrode collector that is a porous metal body disposed in contact with the fuel electrode and performing current collection; and a heating device operated by electric power, wherein the solid electrolyte is a proton-permeable electrolyte, a fuel-gas channel is provided to cause the fuel gas to pass through the fuel-electrode collector, and the porous metal body constituting the fuel-electrode collector is formed of aluminum or aluminum alloy. Herein, the hydrogen-containing fuel gas may be hydrogen gas itself, a gas that mainly contains hydrogen and also contains residual components after reforming of methane or the like, or town gas.

In the air, oxygen is the target. The air also means an oxidizing gas.

In the above-described configuration, the fuel-electrode collector is a porous metal body formed of aluminum or aluminum alloy. Accordingly, this porous metal body can have a higher thermal conductivity than a porous body formed of a metal such as nickel. Nickel has a thermal conductivity of 88.5 W·m$^{-1}$·K$^{-1}$ (0° C. to 100° C.), whereas aluminum has a thermal conductivity of 238 W·m$^{-1}$·K$^{-1}$ (0° C. to 100° C.). Thus, the thermal conductivity can be increased by a factor of about 2.7. As a result, the temperature of the apparatus can be increased to a predetermined operation temperature in a short time from the start-up of the apparatus. This is very important for users of such a product and serves as an important criterion for selection of the product. For example, in offices, factories, and households that rely on electric power from fuel cells during a power cut, fuel cells desirably become operable upon start-up in as short a time as possible. A storage battery may be temporarily used from the instant a power cut occurs to operation of such a fuel cell; however, a short start-up time of the fuel cell allows a storage battery with a low capacity to be used and it is also preferred in terms of peace of mind and safety.

Note that aluminum alloy can be regarded as having a thermal conductivity and an electric resistivity (described below) that are substantially the same as those of aluminum.

The operation temperature of a fuel cell according to the present invention needs to be set such that aluminum or aluminum alloy forming the fuel-electrode collector does not melt. In a case where the fuel cell is heated, for example, within a furnace having a Ni—Cr wire, graphite, or the like as a heating element, the operation temperature varies depending on the definition thereof in terms of position. However, regardless of the position at which the operation temperature is measured, the temperature of the position of the fuel-electrode collector needs to be lower than the melting point of aluminum or aluminum alloy. The melting point of aluminum is about 660° C. (933.25 K). The solidus temperature of aluminum alloy is in the range of 520° C. to 590° C. and hence the operation temperature needs to be lower than such a temperature. Operation at such a low temperature still allows a power generation density, a power generation efficiency, and the like on the practical level. This is achieved mainly by selecting a proton-permeable electrolyte as the solid electrolyte.

Note that, in the present invention, the operation temperature denotes a temperature measured with a temperature sensor disposed in a fuel-cell body (cell stack). For example, this temperature is measured by a thermocouple embedded in an outer member forming the fuel-gas channel of the outermost layer of the cell stack.

In addition to the above-described feature of thermal conductivity, aluminum has an electric resistivity of 2.67 μΩ·cm (20° C.), which is half of that of nickel, 6.9 μΩ·cm (20° C.). Accordingly, the electric resistance of the whole electric system of the fuel cell can be decreased. This feature of electric resistivity can contribute to an increase in power generation efficiency.

Furthermore, aluminum and the like are cost effective, compared with nickel.

The porous metal body constituting the fuel-electrode collector may be a porous body formed by plating with aluminum or aluminum alloy.

Such a plating porous body is formed in the following manner. A foamed resin is subjected to a continuous-pore formation treatment of turning the pores of the resin into a continuous pore. The resin is then plated with metal and subsequently the resin is removed. In a case according to the present invention, a plating treatment with aluminum or aluminum alloy is performed. As a result, a metal-plating porous body can be obtained such that the porosity is high, which allows low pressure drop; the electric resistance is low; and the thermal conductivity, which is a major point, is increased.

A temperature control system may be included that controls at least one of electric power supplied to the heating device, a flow rate of the fuel gas, and a flow rate of the air such that aluminum or aluminum alloy of the fuel-electrode collector does not melt, wherein the temperature control system includes a temperature sensor that monitors a temperature of a fuel-cell body.

Herein, the fuel-cell body denotes a cell stack that is a combination including a stack of a plurality of units each constituted by fuel-electrode collector/MEA/air-electrode collector, and also including members necessary for forming the stack. For example, a temperature sensor (thermocouple) embedded in an end plate serving as the uppermost surface or the lowermost surface of the cell stack is a temperature sensor that monitors the temperature of the fuel-cell body.

Thus, operation can be carried out with stability such that the fuel-electrode collector formed of aluminum or aluminum alloy does not melt.

The proton-permeable electrolyte may have a perovskite structure or a perovskite-like structure and may have a composition represented by ABC oxide where A represents one or two selected from Ba and Sr, B represents one or two selected from Zr and Ce, and C represents at least one selected from Y, Ho, Er, Tm, Yb, Lu, Sc, In, and Gd.

In this case, even when the fuel-electrode collector is formed of aluminum or the like and operation is carried out at a low temperature of less than the melting point of aluminum or the like, sufficient power generation efficiency, power generation density, and the like can be achieved. Examples of such a proton-permeable electrolyte include barium-containing electrolytes such as barium cerium oxide doped with yttrium (BCY), barium zirconium oxide doped with yttrium (BZY), and barium zirconium cerium oxide doped with yttrium (BZCY), which is an intermediate of these; and strontium-containing electrolytes such as strontium zirconium oxide doped with yttrium (SZY), strontium cerium oxide doped with yttrium (SCY), and strontium zirconium cerium oxide doped with yttrium (SZCY), which is an intermediate.

The fuel cell may include a fuel-cell body that is a unit downstream of and including an inlet of the fuel gas and an inlet of the air, and a reformer that is disposed upstream of the fuel-cell body and reforms the fuel gas, wherein an operation temperature of the reformer is set to be higher than an operation temperature of the fuel cell.

In this case, the fuel-cell body including a fuel-electrode collector formed of aluminum or the like can be operated with stability while the reformer is maintained at an appropriate operation temperature.

A humidifying device can be included that adds moisture and is disposed upstream of a portion where the air is introduced into the air electrode and/or upstream of a portion where the fuel gas is introduced into the fuel electrode.

In this case, operation can be carried out without decreasing the moving speed of protons or the density of moving protons in the proton-permeable solid electrolyte.

A method for operating a fuel cell according to the present invention is a method for operating a fuel cell that generates power from a hydrogen-containing fuel gas by an electrochemical reaction. In this operation method, the fuel cell includes a membrane electrode assembly including a fuel electrode, a proton-permeable solid electrolyte, and an air electrode; a fuel-electrode collector that is a porous metal body disposed in contact with the fuel electrode, performing current collection, and formed of aluminum or aluminum alloy; and a heating device operated by electric power. And, flow rates of the fuel gas and the air and supply of electric power to the heating device are controlled such that a temperature of the fuel-electrode collector is not out of a range of 550° C. to 650° C.

In this case, power generation can be continuously carried out with stability while a temperature of less than the melting point of aluminum or the like is maintained with certainty. In order not to cause the temperature of the fuel-electrode collector to be out of the range of 550° C. to 650° C., after all, the heating device housing the body part of the fuel cell is set at a temperature that is at least 100° C. lower than that of existing cases. As a result, electric power consumption for power generation can be reduced. In addition, in existing cases of heating at about 800° C., a higher cost has been incurred due to the necessity of use of an expensive alloy having resistance to high-temperature oxidation such as inconel for, for example, electrode terminals for outputting generated power and interconnectors. It has been proposed that, instead of such an alloy having resistance to high-temperature oxidation, a conductive ceramic is used; however, this conductive ceramic is also expensive. In the present invention, heating is performed at a temperature of 650° C. or less and hence general-purpose stainless steel such as SUS304 can be used. This is highly advantageous in terms of cost effectiveness.

The fuel cell may include a fuel-cell body and a reformer that is disposed upstream of the fuel-cell body, wherein an operation temperature of the reformer may be set to be higher than an operation temperature of the fuel-cell body.

In this case, the reformer and the fuel-cell body can be operated with stability and at high efficiency.

Advantageous Effects of Invention

The present invention can provide a fuel cell that employs a fuel-electrode collector having sufficiently high performance in terms of three items of pressure drop, electric conductivity, and thermal conductivity, to thereby achieve a power generation efficiency and a power generation density satisfying the practical level; and a method for operating the fuel cell.

DESCRIPTION OF EMBODIMENTS

Figure 1:
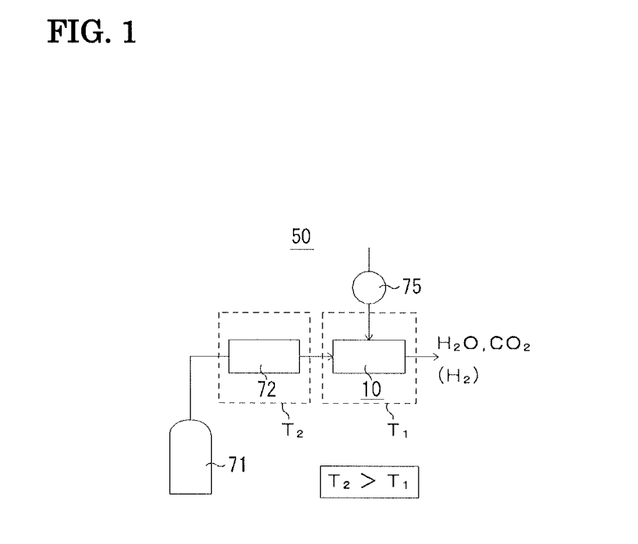
FIG. 1 illustrates the overall configuration of a fuel cell according to an embodiment of the present invention.

FIG. 1 is a schematic view illustrating a fuel cell 50 according to an embodiment of the present invention. A fuel gas introduced into a fuel-cell body 10 is desirably hydrogen gas itself or a gas having a high hydrogen concentration. In many cases, raw materials used are, for example, propane, methane, or methanol in view of versatility, cost effectiveness, or the like. Such a raw material is reformed with a reformer 72 to provide a fuel gas having an increased hydrogen concentration. The fuel gas may be a hydrogen gas having a high purity on the industrial standard, or a gas mainly containing hydrogen and having relatively high contents of hydrocarbons or the like generated by reforming. In FIG. 1, a raw material such as propane, methane, methanol, or ethanol contained in a tank 71 is passed through the reformer 72 and introduced as a fuel gas into the fuel-cell body (cell stack) 10. The air is taken from the atmosphere through a compressor 75 and introduced into the fuel-cell body 10. In FIG. 1, an operation temperature $T_2$ of the reformer 72 can be set to be higher than an operation temperature $T_1$ of the fuel-cell body 10. For example, the fuel-cell body 10 is set at 550° C. to 650° C.; and the reformer 72 is set at 660° C. to 750° C.

Regarding such a raw material, town gas may be directly introduced into the fuel-cell body 10 without being passed through any reformer; alternatively, town gas may be reformed with the reformer 72 so as to have a higher hydrogen concentration and then introduced into the fuel-cell body 10.

Figure 2:
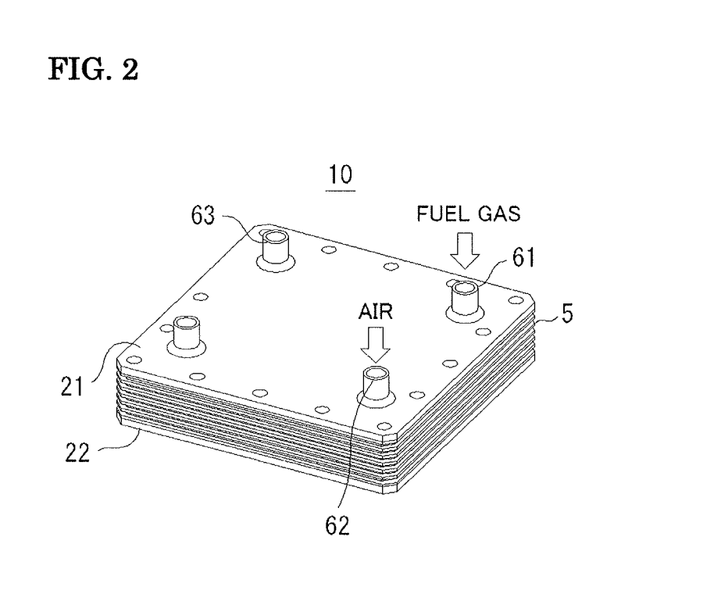
FIG. 2 is a perspective view illustrating the fuel-cell body in FIG. 1.

FIG. 2 is a perspective view illustrating the fuel-cell body 10 or the cell stack 10. In the cell stack 10, cells 5 serving as power generation elements are stacked between a first plate (upper end plate) 21 and a second plate (lower end plate) 22. Each cell 5 is constituted by fuel-electrode collector/MEA/air-electrode collector (described below) and serves as a single power generation unit in the fuel cell. A fuel gas prepared by reforming a hydrocarbon or the like so as to have a higher hydrogen concentration is introduced through an inlet 61 formed in the upper end plate. The air sent from the compressor is introduced through an inlet 62. The fuel gas and the air subjected to an electrochemical reaction mainly yield water vapor, which is discharged through an outlet 63 or the like. In a case where the concentration of a combustible gas is high during discharging, a combustion component or the like can be disposed in the fuel cell. In FIG. 2, both the fuel gas and the air are introduced through the upper end plate 21; alternatively, one of the fuel gas and the air may be introduced through the lower end plate 22.

Figure 3:
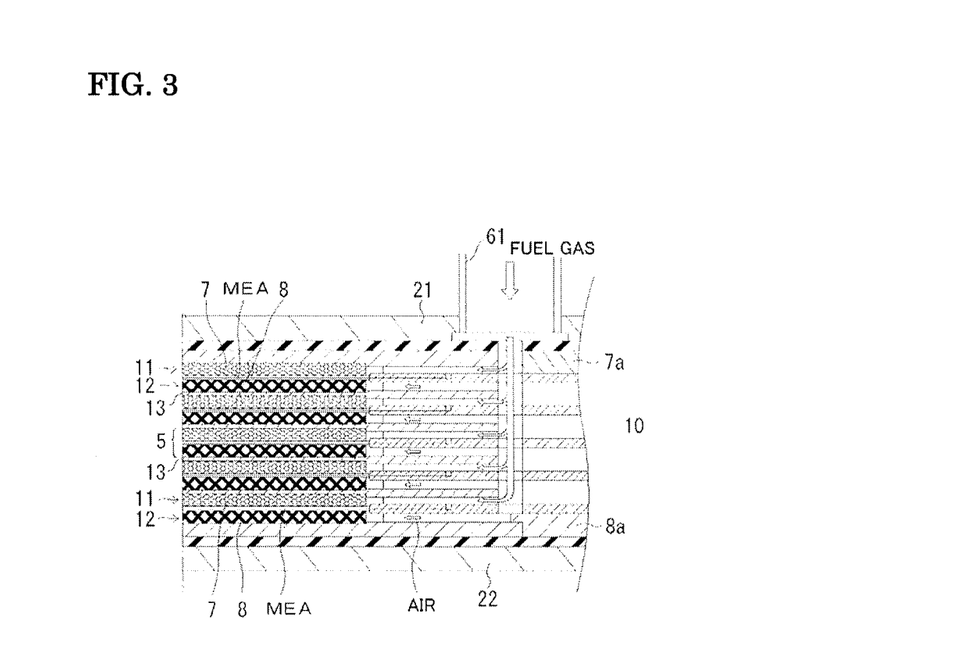
FIG. 3 is a sectional view of the fuel-cell body.

FIG. 3 is a sectional view of the fuel-cell body 10. In FIG. 3, five layers of the cell 5 are stacked; however, more layers such as 10 to 50 layers may be stacked. Each cell 5 serving as a power generation element is constituted by fuel-electrode collector 7/membrane electrode assembly (MEA)/air-electrode collector 8. Such a cell is isolated from neighboring upper and lower cells with insulators 13 therebetween. As described below, the MEA includes a fuel electrode (anode) 2, a solid electrolyte 1, and an air electrode (cathode) 3 that are integrated together.

The fuel gas is supplied through the fuel-gas inlet 61 into a fuel-gas channel 11 occupied by an aluminum-plating body constituting the fuel-electrode collector 7. The air is supplied by a mechanism (not shown) through the air inlet 62 into an air channel 12 occupied by a porous body (Ni mesh or the like) constituting the air-electrode collector 8.

The fuel-gas channel 11 is a space formed between the MEA within the cell 5 and the separator (interconnector) 13 that separates the MEA from an upper cell. The fuel-gas channel 11 is occupied by an aluminum-plating porous body constituting the fuel-electrode collector 7. The air channel 12 is a space formed between the MEA within the cell 5 and the separator (interconnector) 13 that separates the MEA from a lower cell. The air channel 12 is occupied by a porous metal body constituting the air-electrode collector 8.

The cells 5 stacked are connected together in series with the interconnectors 13 therebetween. The electric power generated and collected in the cell stack 10 is output through an anode terminal 7a and a cathode terminal 8a to the outside. The cell stack 10 is bound with bolts or the like provided at the upper end plate 21 and the lower end plate 22.

Figure 4:
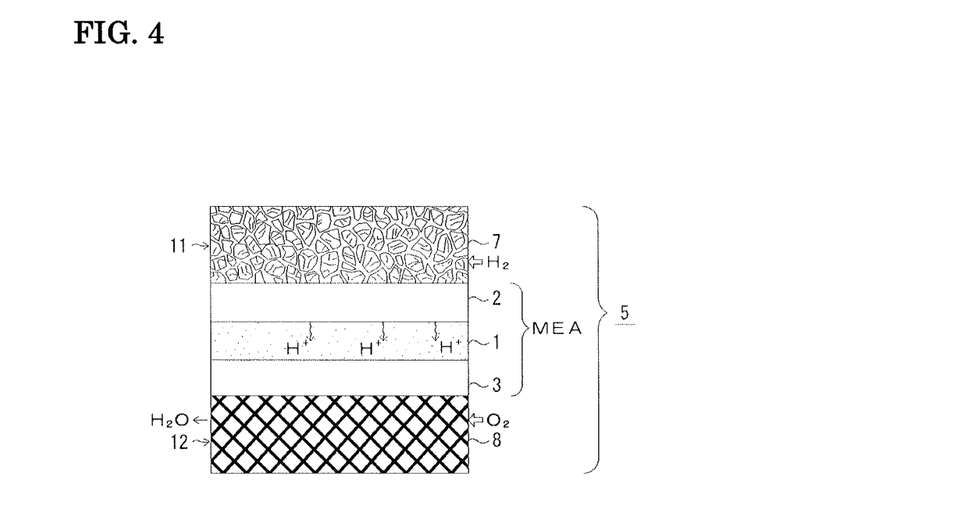
FIG. 4 is an explanatory view illustrating an electrochemical reaction in a cell (power generation element).

FIG. 4 is an explanatory view illustrating an electrochemical reaction occurring in the cell 5 serving as a power generation element. When the fuel gas such as hydrogen flows through the aluminum-plating porous body 7 that occupies and obstructs the fuel-gas channel 11, the fuel gas is in a turbulent state. Hydrogen in such a turbulent state has a higher probability of coming into contact with the fuel electrode 2 for a longer period of time. Thus, a catalyst or the like of the fuel electrode 2 causes a fuel-electrode (anode) reaction of $H_2 \rightarrow 2H^+ + 2e^-$ to proceed at a high rate. Protons $H^+$ generated at the fuel electrode flow from the fuel electrode 2 through the solid electrolyte 1 to the air electrode 3. Electrons $e^-$, which cannot pass through the solid electrolyte 1, flow through electric circuit wiring (not shown) to the air electrode (cathode). The air electrode (cathode) 3 is exposed to oxygen $O_2$ in the air. Protons $H^+$ and electrons $e^-$ having reached the air electrode 3 react with this oxygen under the catalysis of the air electrode 3, so that an air-electrode (cathode) reaction of $2H^+ + 2e^- + \frac{1}{2}O_2 \rightarrow H_2O$ proceeds.

Examples of the material of the fuel electrode 2 include a mixture between metals such as Ni and Fe and at least one of ceramics including $ZrO_2$-based ceramics such as zirconia stabilized with at least one rare earth element such as Se or Y and $CeO_2$-based ceramics. Other examples include metals such as Pt, Au, Ag, Pd, Ir, Ru, Rh, Ni, and Fe. These metals may be used alone or as an alloy of two or more of the metals. Other examples include mixtures (including cermet) each containing such a metal and/or such an alloy and at least one of the above-described ceramics. Other examples include mixtures each containing oxides of metals such as Ni and Fe and at least one of the above-described ceramics.

Examples of the material of the air electrode 3 include various metals, metal oxides, and metal compound oxides. Examples of the metals include metals such as Pt, Au, Ag, Pd, Ir, Ru, and Rh and alloys containing two or more of these metals. Examples of the metal oxides include oxides of La, Sr, Ce, Co, Mn, Fe, or the like (for example, $La_2O_3$, SrO, $Ce_2O_3$, $Co_2O_3$, $MnO_2$, and FeO). Examples of the compound oxides include compound oxides at least containing La, Pr, Sm, Sr, Ba, Co, Fe, or Mn ($La_{1-x}Sr_xCoO_3$-based compound oxides, $La_{1-x}Sr_xFeO_3$-based compound oxides, $La_{1-x}Sr_xCo_{1-y}Fe_yO_3$-based compound oxides, $La_{1-x}Sr_xMnO_3$-based compound oxides, $Pr_{1-x}Ba_xCoO_3$-based compound oxides, and $Sm_{1-x}Sr_xCoO_3$-based compound oxides.

In the present invention, the material of the solid electrolyte 1 is very important. The fuel-electrode collector 7 is constituted by an aluminum-plating porous body. Accordingly, the temperature of the fuel-cell body 10 needs to be maintained to be less than 660° C., which is the melting point of aluminum. However, during heating at, for example, 600° C., whether the above-described electrochemical reaction proceeds at a sufficiently high rate on the practical level or not depends on the solid electrolyte. This point will be described under a heading regarding heating temperature below.

One of the important points of this embodiment is to form the fuel-electrode collector 7 with an aluminum-plating porous body. That is, the aluminum-plating porous body 7 occupies and obstructs the fuel-gas channel 11. Unique advantages of the aluminum-plating porous body 7 are as follows.

(A1) A significant advantage of this porous body over existing porous metal bodies is that, because it is formed of aluminum, it has a high thermal conductivity and allows the fuel cell 50 to become operable in a short time from the start-up of the fuel cell 50. This feature is very important for users of such a product and serves as an important criterion for selection of the product. For example, in offices, factories, and households that rely on electric power from fuel cells during a power cut, fuel cells desirably become operable upon start-up in as short a time as possible. In this case, a storage battery may be temporarily used from the instant a power cut occurs to operation of such a fuel cell; however, a short start-up time of the fuel cell allows a storage battery with a low capacity to be used and it is also considerably preferred in terms of peace of mind and safety.

(A2) The porous body has a high electric conductivity or a low electric resistance. Accordingly, the porous body can function as a fuel-electrode (anode) collector having a low electric resistance, which results in a decrease in the electric resistance of the whole system. Thus, the power generation efficiency of the fuel cell can be increased.

Other advantages can be obtained not only by an aluminum-plating porous body but also by, for example, a nickel-plating porous body. These advantages are as follows.

(B1) The flow of the fuel gas is brought to a turbulent state to thereby continuously move a portion of the gas flow in contact with the surface of the fuel electrode (anode) 2 and to supply new hydrogen. As a result, the decomposition efficiency of hydrogen can be enhanced.

(B2) The presence of the plating porous body results in a decrease in the ratio of hydrogen that passes without reacting.

(B3) The porosity can be set to a high value of 0.65 or more and 0.99 or less, for example, 0.95 or more and 0.98 or less. Accordingly, the aluminum-plating porous body 7 that is wholly formed by plating allows suppression of an increase in pressure drop.

Figure 5A:
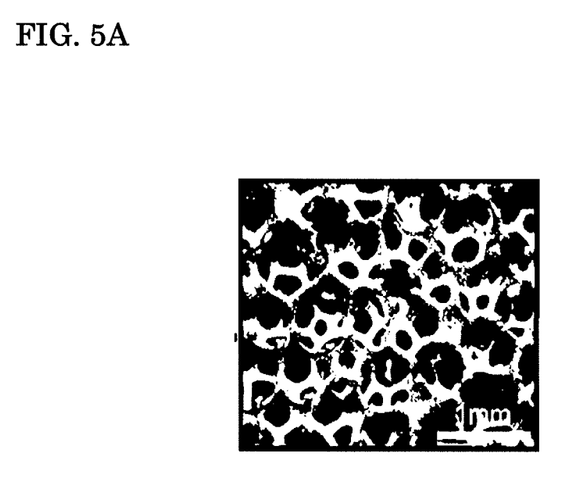
FIG. 5A is a scanning electron microscope (SEM) image of an aluminum-plating porous body forming a fuel-electrode collector, the image illustrating a porous form.
Figure 5B:
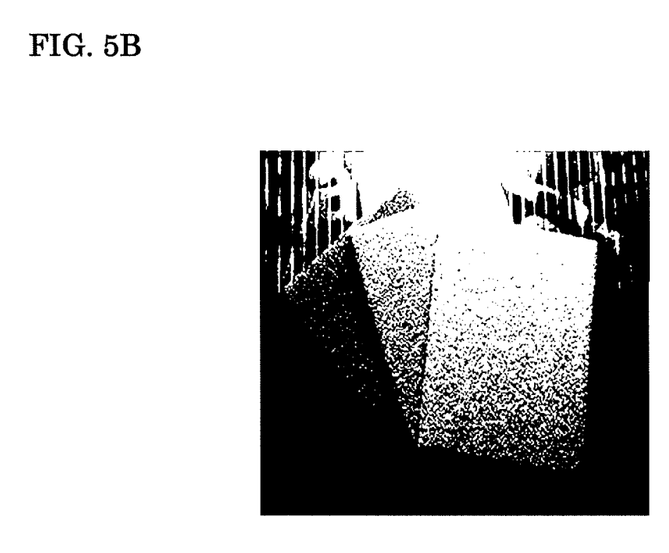
FIG. 5B illustrates sheet-shaped products of an aluminum-plating porous body forming a fuel-electrode collector.

FIGS. 5A and 5B illustrate aluminum-plating porous bodies. FIG. 5A illustrates a porous form. FIG. 5B illustrates sheet-shaped products. FIG. 5A shows that the porosity is high and it seems to be 0.95 or more. FIG. 5B illustrates rectangular sheets having a side length of 10 to 20 cm. Among plating porous body products formed of various metals such as nickel, FIGS. 5A and 5B illustrate aluminum-plating porous bodies that are commercially available from Sumitomo Electric Industries, Ltd. under a product name Celmet (registered trademark).

A method for producing a plating porous body formed of aluminum or aluminum alloy is as follows. A foamed resin is first prepared by foaming a resin such as urethane by a foaming treatment. Subsequently, a continuous-pore formation treatment of turning pores formed by foaming into a continuous pore is performed. The continuous-pore formation treatment mainly includes a film removal treatment. The continuous-pore formation is achieved by removing thin films formed on pores, by a pressurization treatment such as an explosion treatment or a chemical treatment. After that, a conductive carbon film is deposited on the inner wall of the pore or a conductive thin film is formed on the inner wall of the pore by electroless plating or the like. Subsequently, electroplating is performed to form a metal-plating layer on the conductive carbon film or the conductive thin film. This metal-plating layer will serve as the skeleton of a three-dimensional network metal body. The plating with metal is performed with a plating solution containing aluminum ions to form an Al-plating layer. Subsequently, a heat treatment is performed to eliminate the resin. Thus, the metal-plating layer alone is left and an Al-plating porous body is provided.

Al has a high electric conductivity and also a high thermal conductivity. However, Al has a low melting point of 660° C. Accordingly, it has been considered that there is substantially no demand for Al. Thus, aluminum-plating porous bodies have not been discussed.

Figure 6:
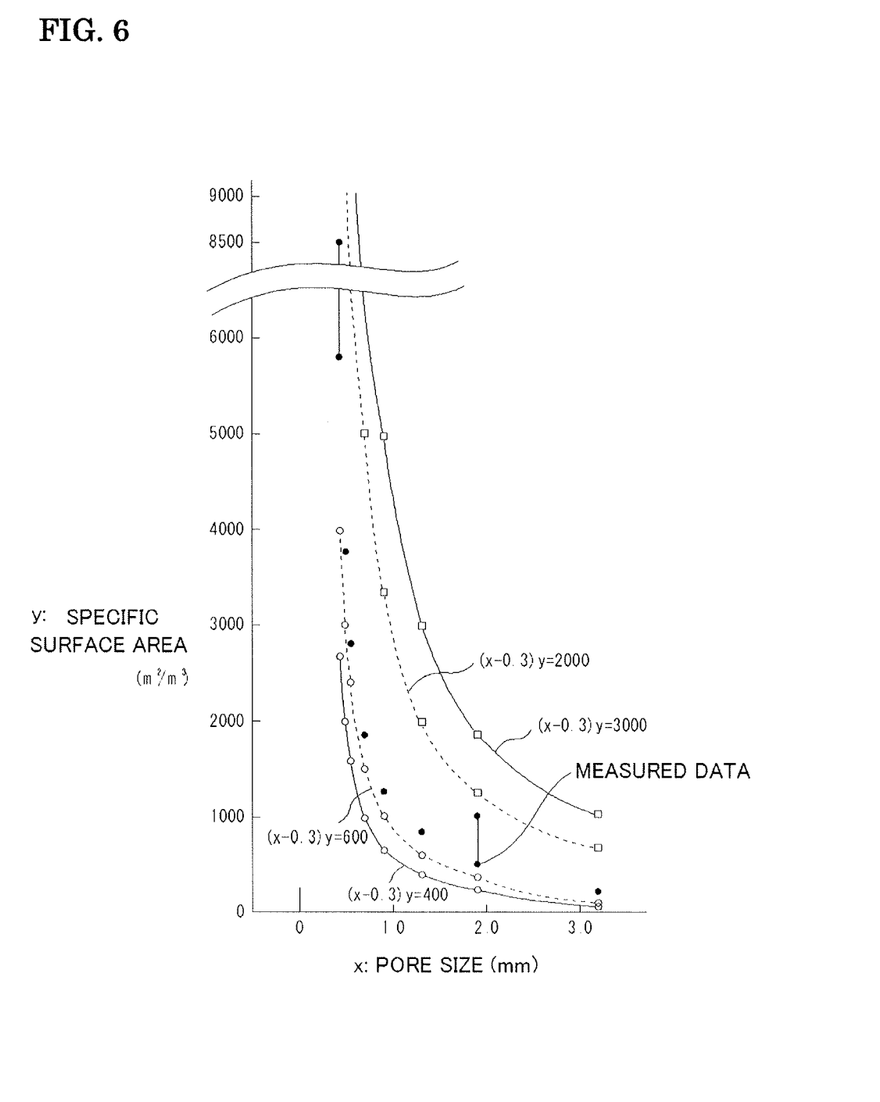
FIG. 6 is a graph illustrating the relationship between the specific surface area and the pore size of a plating porous body.

FIG. 6 illustrates the relationship between the specific surface area (y: $m^2/m^3$) and the pore size (x: mm) of the plating porous body 7 produced by the above-described method. FIG. 6 illustrates measured data of a Ni-plating porous body; and the same values were also obtained in an Al-plating porous body produced by the same method as in the Ni-plating porous body. Accordingly, the relationship in FIG. 6 can be regarded as the data of the Al-plating porous body. The above-described production method can be performed to achieve a pore size in the range of 0.05 to 3.2 mm. In the cases of using urethane, the specific surface area of a measured value is larger than that of hyperbolas of (x−0.3)y=400 or 600 in terms of the same pore size. The lower limit value (asymptote) of the pore size of hyperbolas, 0.3 mm, corresponds to cases of using urethane. A large value of (x−0.3)y provides advantages of maintaining the function of bringing the gas into a turbulent state to cause the fuel electrode 2 to continuously come into contact with and react with new gas, and also allowing a decrease in pressure drop. For this reason, (x−0.3)y preferably satisfies 400≤(x−0.3)y, more preferably 600≤(x−0.3)y. An excessively large pore size may result in, for example, passing of the fuel gas without reacting. Accordingly, the upper limit is preferably about 3000, more preferably about 2000.

In a case of using melamine instead of urethane, the lower limit value of the pore size is 0.05 mm. Regarding a skeleton provided by production using melamine, an expression of the product of pore size and specific surface area is not described. However, when the porosity falls within the range of 0.6 or more and 0.99 or less, a porous metal body provided by production using melamine also falls within the scope of the present invention.

In a case of a metal-powder sinter, the pore size is in the range of 0.05 to 0.3 mm, more preferably in the range of 0.10 to 0.2 mm. The specific surface area is in a very low range, compared with the relationship (x−0.3)y=400 in FIG. 6, which corresponds to production using a urethane resin porous body mold. In general, the higher the porosity, the larger the specific surface area, though there is also an influence of the shape of the skeleton. Thus, while having the same electric conductivity and the same turbulent formation function as metal-powder sinters, the Al-plating porous body 7 allows a decrease in pressure drop, compared with metal-powder sinters.

The air-electrode collector 8 also needs to be a conductive porous body. On the air electrode 3 side, oxygen, which is an oxidizing gas, participates in the reaction. For this reason, resistance to oxidation is important. Thus, the air-electrode collector may be constituted by, for example, an Fe—Cr alloy mesh or a Pt mesh. Such a mesh may be a woven mesh constituted by longitudinal fine wires and lateral fine wires arranged at predetermined intervals, or a grid (mesh) plate formed by punching a metal plate. Fe—Cr, Pt, and the like exhibit sufficiently high resistance to oxidation at about 650° C. or less.

<Regarding Operation Temperature of Fuel-Cell Body and Solid Electrolyte>:

As described above, an aluminum-plating porous body is used as the fuel-electrode collector 7 in the present embodiment. Accordingly, the fuel-cell body 10 needs to be maintained at a temperature less than the melting point of aluminum, 660° C. Thus, for example, during heating at 600° C., the electrochemical reaction of power generation needs to proceed at a sufficiently high rate on the practical level. One of the important factors that allow this is use of a proton-permeable electrolyte as the solid electrolyte 1. Compared with, for example, oxygen ions and the like, protons move fast within the solid electrolyte 1 and pass through the solid electrolyte 1 in a short time. Thus, without heating at 700° C. to 900° C. performed in existing cases, heating at about 600° C. allows sufficient power generation efficiency and power generation density.

Such a proton-permeable solid electrolyte may have a perovskite structure or a perovskite-like structure and may be represented by ABC oxide where A represents one or two selected from Ba and Sr, B represents one or two selected from Zr and Ce, and C represents at least one selected from Y, Ho, Er, Tm, Yb, Lu, Sc, In, and Gd. Of these, examples of particularly suitable solid electrolytes include barium-containing electrolytes such as BCY (barium cerium oxide doped with yttrium), BZY (barium zirconium oxide doped with yttrium), and BZCY, which is an intermediate of these; and strontium-containing electrolytes such as SZY (strontium zirconium oxide doped with yttrium), SCY (strontium cerium oxide doped with yttrium), and SZCY, which is an intermediate.

When the fuel-cell body 10 is operated at a temperature so as not to be out of the range of 550° C. to 650° C., electric power consumption for heating is reduced and the power generation efficiency can be enhanced in accordance with the reduction. There is also another significant advantage described below. In FIG. 3, materials of the anode terminal 7a and the cathode terminal 8a used during heating at 700° C. to 900° C. in existing cases need to have resistance to high-temperature oxidation; accordingly, inconel, which is a high alloy, or conductive ceramics have been used. However, these materials are highly expensive and account for a large proportion of the production cost of the fuel-cell body. In contrast, in the case of the present embodiment in which the heating temperature is not out of the predetermined temperature range of 550° C. to 650° C., inconel and the like are no longer necessary for the anode terminal 7a and the like and can be replaced by general-purpose stainless steel SUS304 or the like. Thus, the production cost of the fuel cell can be considerably reduced.

EXAMPLES

Example 1 Influence of Heating Temperature

An anode-support MEA was produced and evaluated in terms of performance. NiO and BCY (barium cerium oxide doped with yttrium) were subjected to ball milling and then to uniaxial molding processing so as to be formed into a sheet. This would serve as a fuel electrode (anode), that is, a Ni-containing BCY anode 2. This anode was preliminarily sintered at 1000° C. Subsequently, BCY paste that would form the solid electrolyte 1 was applied to the preliminarily sintered anode by screen printing. A binder added during the screen printing was evaporated by a binder-removal treatment at 750° C. Co-sintering was performed at 1400° C. After that, lanthanum strontium manganite (LSM) that would form the air electrode (cathode) 3 was applied to the co-sinter and fired at 1000° C. The fuel electrode 2 was equipped with the aluminum-plating porous body 7. The air electrode 3 was equipped with an FeCr alloy wire mesh or a Pt wire mesh. Thus, a cell 5 was provided. The cell 5 had the following configuration. (air-electrode collector 8 (Fe—Cr alloy or Pt mesh)/air electrode 3 (LSM)/solid electrolyte 1 (BCY)/fuel electrode 2 (Ni-BCY)/fuel-electrode collector 7 (aluminum-plating porous body)

In this stack, the air electrode 3 had a thickness of 20 to 30 μm; the solid electrolyte 1 had a thickness of 30 to 50 μm; and the fuel electrode had a thickness of 500 μm to 1 mm.

The cell stack 10 included a stack of five layers of the cell 5. This cell stack 10 was heated at four temperatures of 600° C., 650° C., 700° C., and 800° C. and evaluated in terms of power generation performance. The temperature was monitored with a thermocouple embedded in the upper end plate 21.

Figure 7:
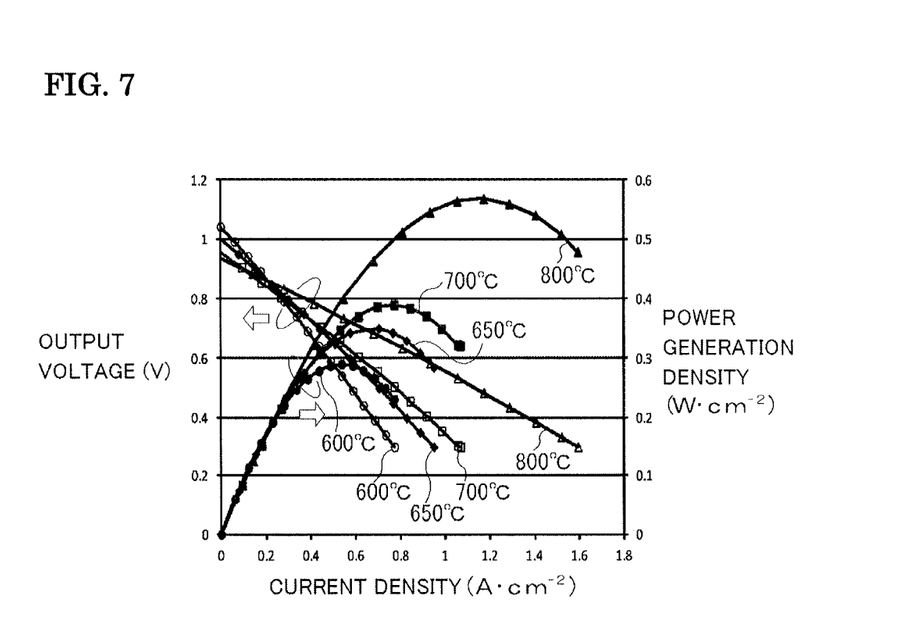
FIG. 7 is a graph illustrating evaluation results of power generation performance of a fuel cell in Example 1.

FIG. 7 illustrates the results of the evaluation. FIG. 7 clearly indicates that the higher the temperature, the higher the power generation density becomes. However, at 600° C., a power generation density of 300 mW·cm$^{-2}$, which sufficiently satisfies the practical level, is achieved. This Example 1 employed an anode-support MEA. Thus, the solid electrolyte was formed so as to have a small thickness. The solid electrolyte was inspected after the evaluation and was found to have a crack in a portion of the solid electrolyte. Thus, mixing of hydrogen and the air probably occurred, which resulted in a relatively low power generation density, compared with Example 2 described below.

Example 2

An electrolyte-support MEA was produced and evaluated in terms of, for example, influence of humidification. A powder of BZY (barium zirconium oxide doped with yttrium) was subjected to ball milling, then preliminarily fired at 1000° C., and subsequently pulverized by ball milling again. After that, the powder was subjected to uniaxial molding processing and heat-treated in an oxygen atmosphere at 1600° C. for 24 h. Thus, the solid electrolyte 1 was provided. Lanthanum strontium cobalt ferrite (LSCF) that would form the air electrode was applied to the solid electrolyte 1 and fired at 1000° C. The fuel electrode 2 was provided by forming a film of silver (Ag) by electroless plating. Thus, the MEA was produced. After that, as in Example, electrode collectors were disposed. The cell 5 had the following configuration. (air-electrode collector 8 (Fe—Cr alloy or Pt mesh or Ag mesh)/air electrode 3 (LSCF)/solid electrolyte 1 (BZY)/fuel electrode 2 (Ag or Ni-BZY, NiFe-based alloy)/fuel-electrode collector 7 (aluminum-plating porous body)

In Example 1, the solid electrolyte 1 had a thickness of 30 to 50 μm. However, Example 2 employed the electrolyte-support configuration and hence the solid electrolyte 1 was formed so as to have a thickness of 275 μm. The air electrode 3 had a thickness of 40 μm; and the fuel electrode 2 had a thickness of 40 μm.

Figure 8:
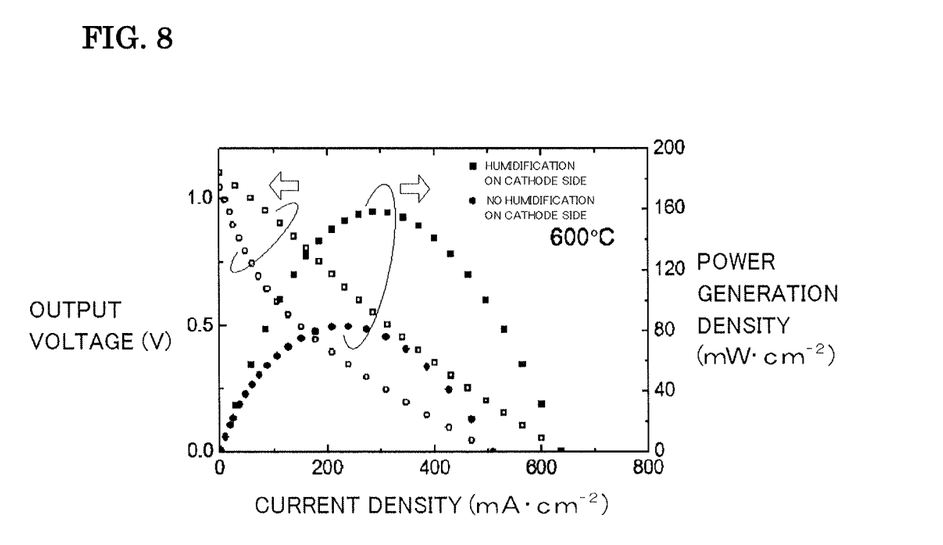
FIG. 8 is a graph illustrating evaluation results of power generation performance of a fuel cell in Example 2.

FIG. 8 illustrates the results of the evaluation. FIG. 8 indicates that humidifying on the cathode side at 600° C. resulted in a high power generation density of 160 mWcm$^{-2}$. Even in a case of no humidification, 80 mW·cm$^{-2}$ was achieved. The advantage of humidification is known not for solid electrolyte but for Nafion (registered trademark), which is well known for its proton conductivity. The importance of moisture in proton conductivity has been demonstrated also in terms of solid electrolyte.

The evaluation results in FIG. 8 indicate the following: by selecting a proton-conductive solid electrolyte and performing humidification or the like, a power generation efficiency that sufficiently satisfies the practical level can be achieved at a heating temperature of about 600° C.

The above-disclosed structures of embodiments of the present invention are mere examples. The scope of the present invention is not limited to the scope of such descriptions. The scope of the present invention is indicated by Claims and is intended to embrace all the modifications within the meaning and range of equivalency of the Claims.

INDUSTRIAL APPLICABILITY

The present invention can provide a fuel cell that employs, as a fuel-electrode collector, a plating porous body formed of aluminum or aluminum alloy so that the fuel cell can be operated at 650° C. or less, which is unprecedentedly low temperature, and becomes operable in a shorter time from the start-up thereof. This fuel cell allows, for example, a high power generation efficiency and is highly cost effective. The present invention can also provide a method for operating this fuel cell.

REFERENCE SIGNS LIST 1 solid electrolyte; 2 fuel electrode (anode); 3 air electrode (cathode); 5 cell (power generation element); 7 fuel-electrode collector; 7a anode terminal; 8 air-electrode collector; 8a cathode terminal; 10 fuel-cell body (cell stack); 11 fuel-gas channel; 12 air channel; 13 interconnector (separator); 21 first plate (upper end plate); 22 second plate (lower end plate); 50 fuel cell; 61 fuel-gas inlet; 62 air inlet; 63 outlet; 71 tank of raw material of fuel gas; 72 reformer; 75 compressor

The invention claimed is:

1. A fuel cell system that generates power from a hydrogen-containing fuel gas and air by an electrochemical reaction, the fuel cell system comprising:
   a membrane electrode assembly (MEA) including a fuel electrode, a solid electrolyte, and an air electrode;
   a fuel-electrode collector that is a porous metal body disposed in contact with the fuel electrode and performing current collection, wherein the porous metal body constituting the fuel-electrode collector is formed of aluminum or aluminum alloy; and
   a heating device operated by electric power,
   wherein the solid electrolyte is a proton-permeable electrolyte,
   a fuel-gas channel is provided to cause the fuel gas to pass through the fuel-electrode collector,
   a fuel-cell body that is a unit downstream of and including an inlet of the fuel gas and an inlet of the air, and
   a reformer with an operation temperature higher than an operation temperature of the fuel cell body, that is disposed upstream of the fuel-cell body and reforms the fuel gas, wherein an operation temperature of the reformer is set to be higher than an operation temperature of the fuel-cell body, wherein the operation temperature of the fuel-cell body is 550 degrees Celsius or more and 650 degrees Celsius or less, and the operation temperature of the reformer is 660 degrees Celsius or more and 750 degrees Celsius or less.

2. The fuel cell system according to claim 1, wherein the porous metal body constituting the fuel-electrode collector is a porous body formed by plating with aluminum or aluminum alloy.

3. The fuel cell system according to claim 1, comprising a temperature control system that controls at least one selected from the group consisting of electric power supplied to the heating device, a flow rate of the fuel gas, and a flow rate of the air such that aluminum or aluminum alloy of the fuel-electrode collector does not melt, wherein the temperature control system includes a temperature sensor that monitors a temperature of a fuel-cell body.

4. The fuel cell according to claim 1, wherein the proton-permeable electrolyte has a perovskite structure or a perovskite-like structure and has a composition represented by ABC oxide where A represents one or two selected from the group consisting of Ba and Sr, B represents one or two selected from the group consisting of Zr and Ce, and C represents at least one selected from the group consisting of Y, Ho, Er, Tm, Yb, Lu, Sc, In, and Gd.

5. The fuel cell system according to claim 1, comprising a humidifying device that adds moisture and is disposed upstream of a portion where the air is introduced into at least one selected from the group consisting of the air electrode and upstream of a portion where the fuel gas is introduced into the fuel electrode.

6. A method for operating a fuel cell system that generates power from a hydrogen-containing fuel gas and air by an electrochemical reaction,
wherein the fuel cell system includes a membrane electrode assembly including a fuel electrode, a proton-permeable solid electrolyte, and an air electrode; a fuel-electrode collector that is a porous metal body disposed in contact with the fuel electrode, performing current collection, and formed of aluminum or aluminum alloy; and a heating device operated by electric power, and
a flow rate of the fuel gas, a flow rate of the air, and supply of electric power to the heating device are controlled such that a temperature of the fuel-electrode collector is not out of a range of 550° C. to 650° C.,
wherein the fuel cell system includes a fuel-cell body and a reformer that is disposed upstream of the fuel-cell body, wherein an operation temperature of the reformer is set to be higher than an operation temperature of the fuel-cell body.

7. The method for operating a fuel cell system according to claim 6, wherein the operation temperature of the fuel-cell body is 550 degrees or more and 650 degrees or less, and the operation temperature of the reformer is 660 degrees or more and 750 degrees or less.

8. The fuel cell system according to claim 1, wherein the fuel-gas flows so as to directly contact with a surface of the aluminum or the aluminum alloy.

9. The method for operating a fuel cell system according to claim 6, wherein the fuel-gas flows so as to directly contact with a surface of the aluminum or the aluminum alloy.

* * * * *